United States Patent [19]
Giorgetti et al.

[11] Patent Number: 5,678,662
[45] Date of Patent: Oct. 21, 1997

[54] DISC BRAKE

[75] Inventors: Alberto Giorgetti; Giovanni Paolo Pacchiana, both of Bergamo, Italy

[73] Assignee: Freni Bremo - S.p.A., Curno, Italy

[21] Appl. No.: 611,617

[22] Filed: Mar. 8, 1996

[30] Foreign Application Priority Data

Mar. 13, 1995 [IT] Italy ................. MI95A0482

[51] Int. Cl.$^6$ ........................................ F16D 66/02
[52] U.S. Cl. ........................ 188/1.11; 188/1.11 WE
[58] Field of Search ............. 188/1.11 W, 1.11 WE, 188/1.11 E; 73/121, 129; 116/208; 340/454

[56] References Cited

U.S. PATENT DOCUMENTS

| | | | |
|---|---|---|---|
| 3,533,491 | 10/1970 | Svenson | 188/1.11 W |
| 3,604,865 | 9/1971 | Bricker | 188/1.11 WE |
| 3,716,113 | 2/1973 | Kobayashi et al. | 188/1.11 WE |
| 4,005,766 | 2/1977 | Kennel | 188/1.11 W |
| 4,279,214 | 7/1981 | Thom | 188/1.11 W |
| 4,356,897 | 11/1982 | Urban | 188/1.11 W |
| 4,508,196 | 4/1985 | Jamon | 116/208 |
| 4,606,435 | 8/1986 | Johnson | 188/1.11 WE |
| 4,658,936 | 4/1987 | Moseley | 188/1.11 W |
| 5,228,541 | 7/1993 | Plude | 188/1.11 W |

*Primary Examiner*—Robert J. Oberleitner
*Assistant Examiner*—Chris Schwartz
*Attorney, Agent, or Firm*—Fitzpatrick, Cella, Harper & Scinto

[57] ABSTRACT

A disc brake which allows immediate visual checking of the wear of the pad includes a caliper body straddling a disc, a pad supported in the caliper body by a metal plate in a position facing the disc, an indicator rod attached to the plate and extending outside the caliper body, and a visible reference associated with the caliper body and facing the indicator rod.

7 Claims, 2 Drawing Sheets

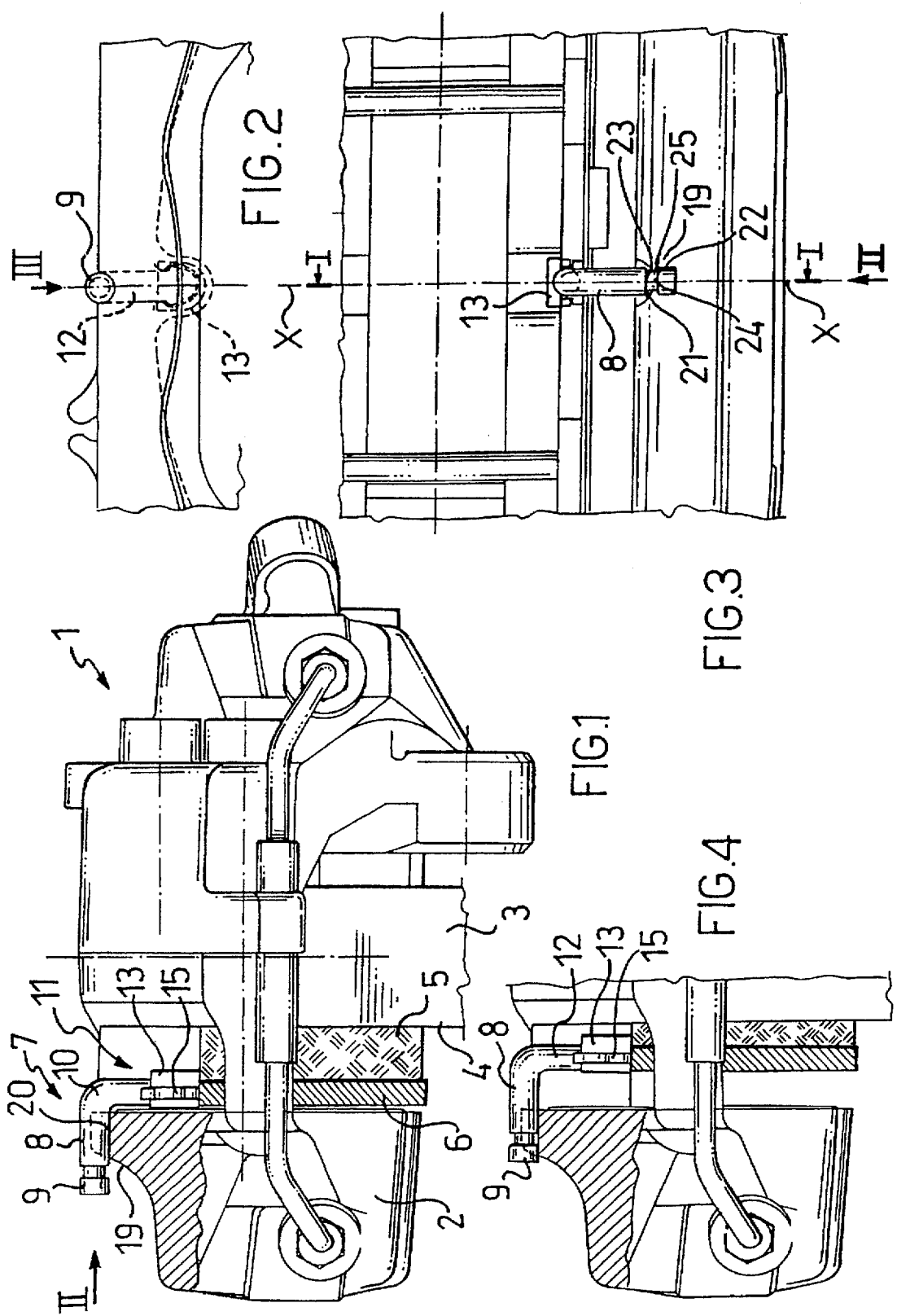

DISC BRAKE

FIELD OF THE INVENTION

The present invention concerns a disc brake of the type comprising a caliper body straddling a disc of predetermined axis, and a pad supported in the caliper body by a metal plate in a position facing the disc.

In the field of disc brakes of the specified type, particularly when used in motor vehicles and the like, the wear of the pad needs to be checked.

BACKGROUND OF THE INVENTION

Electrical wear-indicating devices are known which indicate that the pad is practically worn out by switching on a warning light on the dashboard of the motor vehicle.

Such warning devices are advantageous in many ways but do not, however, give any indication of the progressive state of wear of the pad, indicating the wear only when the pad is virtually worn out.

They are, therefore, useless during regular servicing when it is advisable to replace the pads as a preventative measure even if they are not completely worn out so as to guarantee the efficiency of the motor vehicle during the interval between the current service and the next planned service.

Sliding gauge tools are currently used to determine the wear of the pads but these, being universal instruments, cannot indicate the wear of the pad in situ, with the disc brake assembled and the wheel fitted.

The problem upon which the present invention is based is that of devising a disc brake of the specified type having structural and functional characteristics which satisfy the aforesaid requirement while, at the same time, overcoming the disadvantages cited with respect to the prior art.

SUMMARY OF THE INVENTION

This problem is solved by a disc brake of the specified type characterised in that it comprises a device mounted on the disc brake for indicating visually the wear of the pad.

According to the invention the device comprises an indicator rod attached to the plate by fixing means and extending parallel to the axis of the disc towards the outside, and a visible reference associated with the caliper body and facing the indicator rod.

BRIEF DESCRIPTION OF THE DRAWINGS

Further characteristics and advantages of the disc brake according to the invention will become clear from the following description of one embodiment, given by way of non-limitative example with reference to the appended drawings, in which:

FIG. 1 is a partial section of a disc brake according to the invention taken on the line I—I;

FIG. 2 shows a detail of the disc brake of FIG. 1 taken in the direction of the arrow II;

FIG. 3 shows the disc brake of FIG. 1 taken in the direction of the arrow III;

FIG. 4 is a sectional view of the disc brake of FIG. 1 taken in a different stage of its operation;

DETAILED DESCRIPTION OF THE INVENTION

Figure 5:
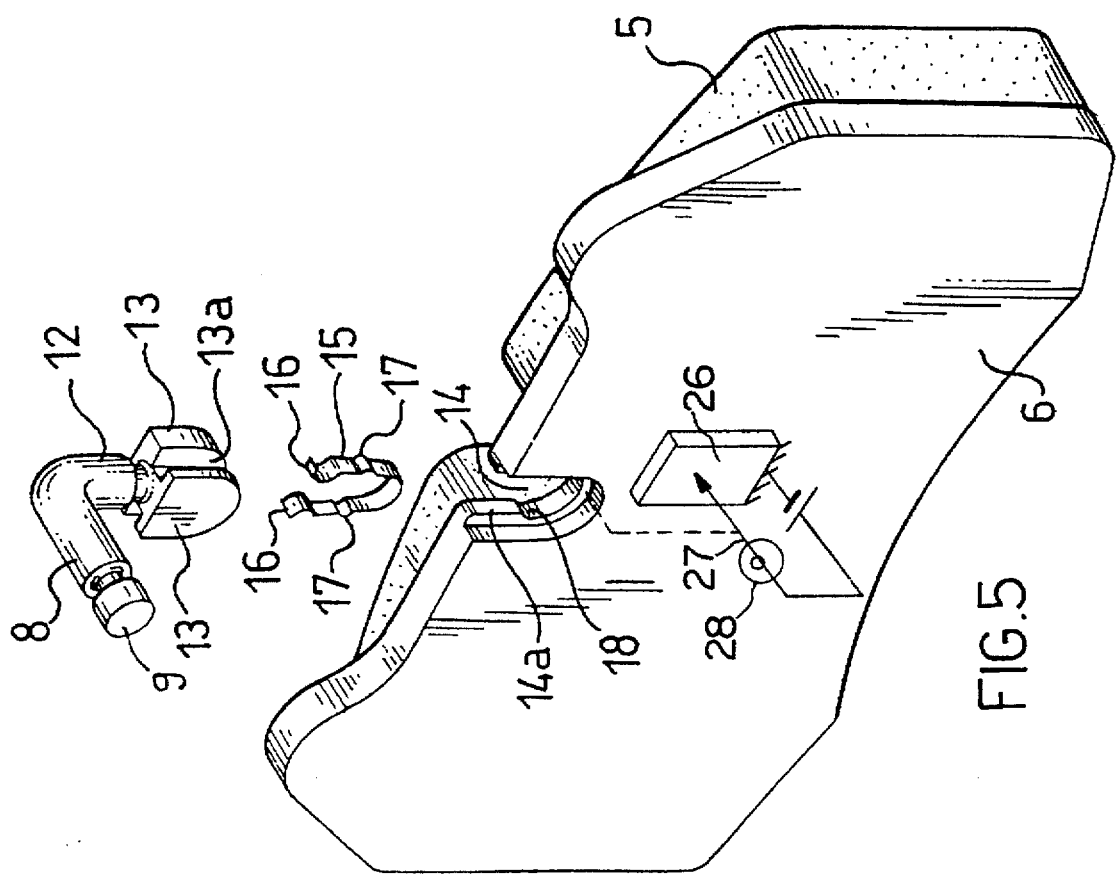
FIG. 5 is a perspective view of a detail of the disc brake of FIG. 1 with the parts separated.
Figure 6:
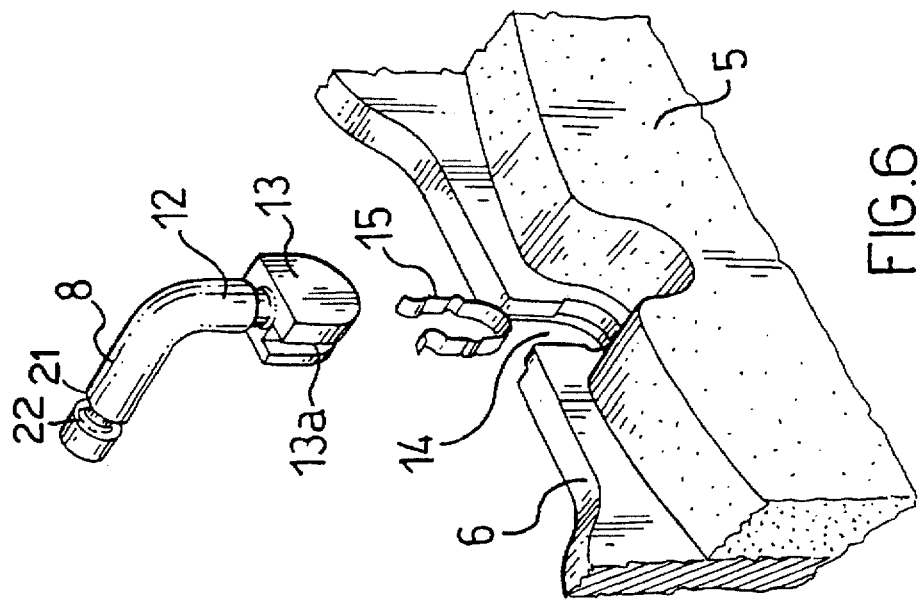
FIG. 6 is a perspective view of the detail of FIG. 5 from a different angle with the parts separated.

With reference to the appended drawings, a disc brake according to the invention is generally indicated at 1.

The disc brake 1 includes a caliper body 2 straddling a disc 3 having a predetermined axis X—X and an outer face 4. A pad 5 is supported in the caliper body 2 by a metal plate 6, of steel in this example, so that it faces the outer face 4 of the disc 3. The disc brake 1 according to the invention includes a device 7 mounted permanently on the disc brake for indicating visually the wear of the pad 5.

In particular, the device 7 includes a small indicator rod 8 which extends parallel to the axis X—X and has a flat free end 9 towards the outside and an opposite end 10 attached to the plate 6 by releasable fixing means 11. The releasable fixing means 11 are in the form of an arm 12 which projects at right angles from the end 10 of the indicator rod 8 and a head 13 at the end of the arm 12 which is releasably snap-engaged in a seat 14 formed in the plate 6.

A U-shaped groove 13a formed in the head 13 is engaged by a cooperating U-shaped rib 14a which projects into the seat 14.

The head 13 is snap-engageable in the seat 14 by means of a substantially U-shaped spring clip 15 housed in the groove 13a in the head 13 and which contacts the rib 14a. More particularly, the spring clip 15 almost surrounds the head 13 and is-retained on it by end portions 16 which are bent towards the-inside of the U-shape. The spring clip 15 is snap-retained in the seat 14 by the engagement of projections 17 which project outwardly from the sides of the U-shape in cooperating recesses 18 in the rib 14a.

The device 7 also includes a visible reference 19 associated with the caliper body 2 and facing the indicator rod 8.

The indicator rod 8 preferably has a circular section and the caliper body 2 includes an axially-extending channel 20 of substantially semi-circular section. The indicator rod 8 slides freely in the channel 20 in which it is partially housed.

The visible reference 19 is on the outer surface of the caliper body 2 at the outer end of the channel 20; and, as can be seen in FIGS. 1 and 3, the visible reference 19 is formed by the intersection of the outer end of the channel 20 with the outer surface of the caliper body 2.

The indicator rod 8 includes marks 21 and 22 which are located in correspondence with the visible reference 19 when the wear of the pad reaches 25% and 50% respectively. More particularly, the marks 21 and 22 comprise two opposing shoulders 23 and 24 defined by a groove 25 formed in the indicator rod 8.

It should be noted that the length of the indicator rod 8 is selected such that, when its flat free end 9 is in correspondence with the visible reference 19, the wear of the pad is virtually 100%.

It should be noted that the seat 14 is preferably shaped such that it mates with a conventional terminal (FIG. 5) of a cable 27 of an electrical wear-indicating warning light 38.

The indicator rod 8, the arm 12 and the head 13 are preferably formed as a single unit from an appropriate plastics material.

In use, or rather as the result of use, the pad 5 gets thinner as a result of wear and the plate 6 consequently gets gradually closer to the outer face 4 of the disc 3 and the indicator rod 8 moves axially inwards, also getting gradually closer to the outer face 4 of the disc 3 in such a way that first the mark 21, then the mark 22, and finally the flat free end 9 are brought successively into correspondence with the visible reference 19.

Whenever there is any intervention in the form of regular servicing, the wear on the pad 5 is seen immediately by the positioning of the marks 21, 22 on the indicator rod 8 in relation to the visible reference 19.

The main advantage of the disc brake according to the present invention is that the wear of the pads can be seen at any time. A further advantage of the disc brake according to the present invention lies in the exceptional structural simplicity of the wear-indicator, which is such that it would be expected to last almost indefinitely.

It should also be noted that the device for indicating the wear of the disc brake according to the invention can be retrofitted on existing disc brakes.

Obviously, an expert in the field may introduce numerous modifications and variants to the disc brake according to the invention in order to satisfy specific, contingent requirements, all however falling within the scope of protection of the invention as defined by the following claims.

We claim:

1. A disc brake of the type comprising a caliper body straddling a disk which has a predetermined axis and a pad supported in the caliper body by a plate in a position facing the disc, an indicator rod attached to the plate and extending along an axially extending channel formed on the outside surface of the body and a visible reference formed on the body by the outer end of the channel.

2. A disc brake according to claim 1, wherein the indicator rod has marks which are located in correspondence with the visible reference when the wear of the pad reaches respective predetermined values.

3. A disc brake according to claim 2, wherein the indicator rod comprises a groove defining two opposing shoulders which constitute said marks which are located in correspondence with the visible reference when the wear of the pad reaches 25% and 50% respectively.

4. A disc brake according to claim 3, wherein the indicator rod has a flat free end which is located in correspondence with the visible reference when the wear of the pad reaches 100%.

5. A disc brake according to claim 4, wherein the means for fixing the indicator rod to the plate comprise an arm projecting at right angles from the end of the rod opposite the flat end and a head at the free end of the arm which is snap-engaged in a seat formed in the plate.

6. A disc brake according to claim 5, wherein the seat is connected to a conventional terminal of a cable of a warning light of an electrical wear indicator.

7. In a device for indicating visually the wear of a pad supported by a metal plate in a caliper body of a disc brake, an indicator rod attached to the plate and extending along an open channel formed on the outer surface of the caliper body as well as a visible reference formed by the intersection of an outer end of the channel with the outer surface of the caliper body.

* * * * *

UNITED STATES PATENT AND TRADEMARK OFFICE
CERTIFICATE OF CORRECTION

PATENT NO. : 5,678,662

DATED : OCTOBER 21, 1997

INVENTOR(S) : ALBERTO GIORGETTI and
GIOVANNI PAOLO PACCHIANA

It is certified that error appears in the above-identified patent and that said Letters Patent is hereby corrected as shown below:

On title page, item

[73] Assignee

"Freni Bremo - S.p.A."
should read --Freni Brembo - S.p.A.--;

Column 1, line 52, "line I-I;" should read --line I-I of FIG. 3;--
Column 1, line 54, "arrow II;" should read --arrow II of FIG. 1;--
Column 1, line 56, "arrow III;" should read --arrow III of FIG. 2;--
Column 2, line 23, "is-retained" should read --is retained--;
Column 2, line 51, "light 38." should read --light 28.--.

Signed and Sealed this

Twenty-fourth Day of February, 1998

Attest:

BRUCE LEHMAN

Attesting Officer

Commissioner of Patents and Trademarks